(12) United States Patent
Beattie, Jr. et al.

(10) Patent No.: US 10,455,054 B2
(45) Date of Patent: Oct. 22, 2019

(54) CROSS-SERVICES APPLICATION SERVICE, DEVICE AND NETWORK CONTENT DELIVERY MANAGEMENT

(71) Applicant: AT&T INTELLECTUAL PROPERTY I, L.P., Atlanta, GA (US)

(72) Inventors: James G. Beattie, Jr., Bergenfield, NJ (US); Roque Rios, Middletown, NJ (US); Stephen F. Triano, Hillsborough, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 858 days.

(21) Appl. No.: 14/879,478

(22) Filed: Oct. 9, 2015

(65) Prior Publication Data

US 2017/0104845 A1    Apr. 13, 2017

(51) Int. Cl.
G06F 15/173 (2006.01)
H04L 29/08 (2006.01)
H04L 12/911 (2013.01)

(52) U.S. Cl.
CPC .......... *H04L 67/327* (2013.01); *H04L 47/781* (2013.01); *H04L 67/104* (2013.01)

(58) Field of Classification Search
CPC .... H04L 67/327; H04L 67/104; H04L 47/781
(Continued)

(56) References Cited

U.S. PATENT DOCUMENTS 5,790,173 A    8/1998   Strauss et al.
5,999,525 A    12/1999  Krishnaswamy et al.
(Continued)

FOREIGN PATENT DOCUMENTS

CA   2790225   4/2013
EP   0764381   3/1997
(Continued)

OTHER PUBLICATIONS

Sayah et al., "On-demand business collaboration enablement with web services." Decision Support Systems 40.1 (2005): 107-127. ftp://ftp.cs.ntust.edu.tw/hlwei/EB2007/reading/25-DSS2005-On-demand%20business%20collaboration%20enablement%20with%20web%20services.pdf.
(Continued)

*Primary Examiner* — Moustafa M Meky
*Assistant Examiner* — Sahera Halim
(74) *Attorney, Agent, or Firm* — Akerman LLP; Michael K. Dixon; Mammen (Roy) P. Zachariah, Jr.

(57) ABSTRACT

A system for providing cross-services application service, device, and network content delivery management is disclosed. In particular, the system may allow devices and application services supported by multiple network services to leverage the strengths of such network services to ensure that content delivery is efficiently accomplished. The system may enable a device or application service to be associated with a management domain. Then, the management domain may subscribe the device or application service with one or more underlying supporting networks of the management domain. The associating and subscribing may be performed for the management domain by an orchestrator or by a management domain authority. The management domain authority may include a predictive, machine-learning element that drives access to content on behalf of the management domain authority through its devices and services to which they are subscribed.

21 Claims, 3 Drawing Sheets

(58) Field of Classification Search
USPC .......................................... 709/225, 244, 249
See application file for complete search history.

(56) References Cited

U.S. PATENT DOCUMENTS

| | | | |
|---|---|---|---|
| 7,171,460 | B2 | 1/2007 | Kalavade et al. |
| 7,254,622 | B2 | 8/2007 | Nomura et al. |
| 7,376,388 | B2 | 5/2008 | Ortiz et al. |
| 7,634,796 | B2 | 12/2009 | Son et al. |
| 8,191,098 | B2 | 5/2012 | Cooper et al. |
| 8,327,011 | B2 | 12/2012 | Price |
| 8,396,075 | B2 | 3/2013 | Skoczkowski et al. |
| 8,520,850 | B2 * | 8/2013 | Helms ............... H04L 63/0428 380/201 |
| 8,584,182 | B2 | 11/2013 | Berberet et al. |
| 8,611,825 | B2 | 12/2013 | Gerber et al. |
| 8,776,185 | B2 | 7/2014 | Piepenbrink et al. |
| 8,934,379 | B2 | 1/2015 | Swanburg et al. |
| 8,983,978 | B2 | 3/2015 | Priyadarshan et al. |
| 9,025,525 | B2 | 5/2015 | Aksu et al. |
| 2004/0133487 | A1 | 7/2004 | Hanagan et al. |
| 2010/0020728 | A1 | 1/2010 | Jefferson et al. |
| 2012/0300747 | A1 | 11/2012 | Westberg et al. |
| 2012/0309383 | A1 | 12/2012 | Van Phan et al. |
| 2014/0280985 | A1 * | 9/2014 | Maguire ............... H04W 36/18 709/227 |
| 2014/0313908 | A1 | 10/2014 | da Silva et al. |
| 2015/0172470 | A1 * | 6/2015 | Sharma ............... H04L 43/0882 455/406 |

FOREIGN PATENT DOCUMENTS

| | | | |
|---|---|---|---|
| GB | 2483120 | 2/2012 | |
| GB | 2483120 A * | 2/2012 | ........... H04L 12/403 |
| WO | 02084971 | 10/2002 | |
| WO | 2013184225 | 12/2013 | |

OTHER PUBLICATIONS

Wu et al., "Data management platform functions to support network and operations programmability." Communications, 1991. ICC'91, Conference Record. IEEE International Conference on. IEEE, 1991. http://ieeexplore.ieee.org/xpl/login.jsp?tp=&arnumber=162442&url=http%3A//ieeexplore.ieee.org/xpls/abs_all.jsp%3Farnumber%3D162442.

Simon et al., "Scalable Quality of Service Solutions for IP Networks and Services." Oct. 1, (2011): 137. http://www.omikk.bme.hu/collections/phd/Villamosmernoki_es_Informatikai_Kar/2012/Simon_Csaba/ertekezes.pdf.

Debusmann et al., "Unifying service level management using an MDA-based approach." Network Operations and Management Symposium, 2004. NOMS 2004. IEEE/IFIP. vol. 1. IEEE, 2004. http://dpnm.postech.ac.kr/papers/NOMS/04/review/1568916869.pdf.

* cited by examiner

CROSS-SERVICES APPLICATION SERVICE, DEVICE AND NETWORK CONTENT DELIVERY MANAGEMENT

FIELD OF THE INVENTION

The present application relates to technologies for providing cross-services and content delivery management, and more particularly, to a system and method for providing cross-services application service, device, and network content delivery management.

BACKGROUND

In today's society, users and organizations are increasingly utilizing smartphones and other computing devices to gain access to the Internet, request and access various types of content, access software applications, access software services, access large volumes of data, and perform a variety of other tasks and functions. Currently, in order to handle large volumes of requests from users requesting content, services, and applications, content providers often employ the use of content delivery networks and systems to serve the content and provide the services to the users in a more efficient and effective manner. Content delivery networks are particularly useful when high performance, reliability, scalability, and cost savings associated with distributing the content and providing the services are important to the content providers that provide the content, services, and software applications.

Despite the tremendous benefits that content delivery networks and other technologies provide today, there is still room for enhancing the functionality of content delivery networks and their associated technologies. As an example, user devices currently have to be associated with each individual network through which the user devices operate on a case by case basis. A tablet device may associate and register with a cellular network by using a specific process that includes utilizing the cellular network itself, the tablet device's identifier, a telephone number associated with the tablet device, and other information. Then, the same tablet device may also need to be registered separately on one or more Wi-Fi networks through which the tablet device operates. The cellular network and the one or more Wi-Fi networks may each have separate administrative processes that have to be performed iteratively. As a result, if a user or a domain has many associated devices, each device will need to be separately configured for each of the supporting networks through which the devices will need to operate. When a new network is added to the list of supporting networks, then the process of configuration for each of the devices has to be repeated. Similarly, when a new application service is added by the user to a device or to a supporting network, similar configuration processes also need to be conducted. Another example issue associated with content delivery networks and their associated technologies is that content access is often denied to users and organizations because of its close coupling to content consumption.

SUMMARY

A system and accompanying methods for providing cross-services application service, device, and network content delivery management are disclosed. In particular, the system and methods may involve centralizing the administration of devices and applications with each other and across the supporting networks through which the devices and applications operate. In order to accomplish the foregoing, the system and methods may involve utilizing a centralized management domain authority engine in a cloud-computing environment, as a local service, or a combination thereof. A management domain authority may create the management domain authority engine and an accompanying database to ensure that the policies of the management domain authority are followed by each of the devices, networks, and application services in the management domain of the management domain authority. Such policies may include, but are not limited to, policies relating to cost caps, minimum/maximum/average bandwidth, bandwidth consumption, packet latency, jitter and packet loss requirements, security requirements, time of day/day of week requirements, locations, digital rights management parameters, account status, other policies, or any combination thereof.

By utilizing the management domain authority engine, the system and methods may allow devices and application services supported by multiple network services to leverage the strengths of such network services to ensure that content delivery is efficiently accomplished, while also avoiding the pitfalls of those network services that are less capable, less efficient, and/or less cost-efficient. The system and methods may enable a device or application service to be associated with a management domain controlled by the management domain authority. The management domain may then automatically subscribe the device or application service with one or more underlying supporting networks of the management domain. The associating and subscribing may be performed for the management domain by an orchestrator or by the management domain authority, such as by utilizing the management domain authority engine.

In certain embodiments, the management domain authority may include a predictive, machine-learning element that drives access to content on behalf of the management domain authority through its devices and services to which they are subscribed. Also, in certain embodiments, when a new application service is added to a device or a supporting network, the system and methods may include automatically configuring the new application service for other devices, networks, and/or services under the management domain authority without manual intervention. In additional embodiments, the system and methods may allow any device, application service, and/or network to access (e.g. download) content, while ensuring that the consumption of the content is constrained to only the authorized time, place, format, device, etc., or a combination thereof. In further embodiments, as a user of the application service and/or device transits physical space, a predictive scheduler of the management domain authority may anticipate content requirements for its devices and users, and may download all or part of selected content to the most capable devices in the management domain. In still further embodiments, in anticipation of a management domain authority-driven supporting network change, a device and/or application service may take measures to associate with other supporting networks so as to allow for a smooth transition, such as during a download or streaming of selected content.

In one embodiment, a system for providing cross-services application service, device, and network content delivery management is disclosed. The system may include a memory that stores instructions and a processor that executes the instructions to perform various operations of the system. The system may perform an operation that includes associating a first device with a management domain under control of a management domain authority.

The system may then perform an operation that includes propagating a policy of the management domain authority to the first device. Additionally, the system may perform an operation that includes subscribing, in accordance with the policy, the first device with a plurality of networks associated with the management domain. Furthermore, the system may perform an operation that includes receiving, from the first device, a request for content. Moreover, the system may perform an operation that includes providing, to the first device and in response to the request, access to the content in accordance with the policy of the management domain authority. The access to the content may be provided via at least one network of the plurality of networks to which the first device is subscribed.

In another embodiment, a method for providing cross-services application service, device, and network content delivery management is disclosed. The method may include utilizing a memory that stores instructions, and a processor that executes the instructions to perform the various functions of the method. In particular, the method may include associating a first device with a management domain under control of a management domain authority. Additionally, the method may include propagating a policy of the management domain authority to the first device. The method may also include subscribing, in accordance with the policy, the first device with a plurality of networks associated with the management domain. Furthermore, the method may include receiving, from the first device, a request for content. Moreover, the method may include providing, to the first device and in response to the request, access to the content in accordance with the policy of the management domain authority. The access to the content may be provided via at least one network of the plurality of networks to which the first device is subscribed.

According to yet another embodiment, a computer-readable device having instructions for providing cross-services application service, device, and network content delivery management is provided. The computer instructions, which when loaded and executed by a processor, may cause the processor to perform operations including: associating a first device with a management domain under control of a management domain authority; propagating a policy of the management domain authority to the first device; subscribing, in accordance with the policy, the first device with a plurality of networks associated with the management domain; receiving, from the first device, a request for content; and providing, to the first device and in response to the request, access to the content in accordance with the policy of the management domain authority, wherein the access to the content is provided via at least one network of the plurality of networks to which the first device is subscribed.

These and other features of the systems and methods for providing cross-services application service, device, and network content delivery management are described in the following detailed description, drawings, and appended claims.

DETAILED DESCRIPTION OF THE INVENTION

Figure 1:
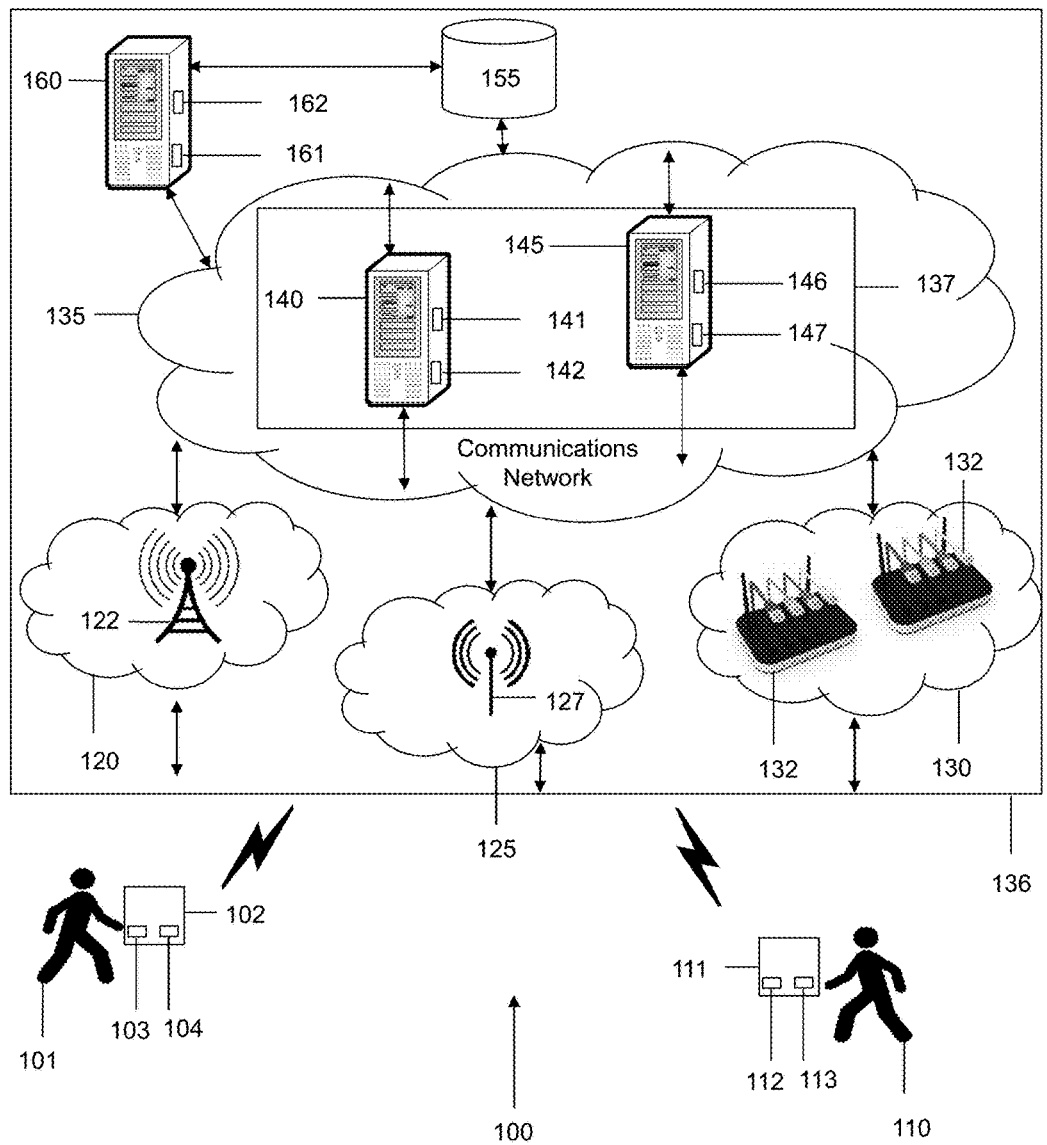
FIG. 1 is a schematic diagram of a system for providing cross-services application service, device, and network content delivery management according to an embodiment of the present disclosure.

A system 100 and accompanying methods for providing cross-services application service, device, and network content delivery management are disclosed. In particular, the system 100 and methods may involve centralizing the administration of devices and applications with each other and across the supporting networks 120, 125, 130, 135 through which the devices and applications operate. In order to accomplish the foregoing, the system 100 and methods may involve utilizing a centralized management domain authority engine 137 in a cloud-computing environment, as a local service, or a combination thereof, to facilitate the foregoing. A management domain authority may create the management domain authority engine 137 and an accompanying database, such as database 155, to ensure that the policies of the management domain authority are followed by each of the devices, networks, and application services in the management domain 136 of the management domain authority. Such policies may include, but are not limited to, policies relating to cost caps, minimum/maximum/average bandwidth, bandwidth consumption, packet latency, jitter and packet loss requirements, security requirements, time of day/day of week requirements, locations, digital rights management parameters, account status, other policies, or any combination thereof.

By utilizing the management domain authority engine 137, the system 100 and methods may allow devices and application services supported by multiple network services to leverage the strengths of such network services to ensure that the delivery of content is efficiently accomplished. Notably, the content may be delivered efficiently while also avoiding the pitfalls of those network services that are less capable, less efficient, and/or less cost-efficient. The system 100 and methods may enable a device (e.g. first user device 102) or an application service to be associated with the management domain 136 controlled by the management domain authority. The management domain 136 may then subscribe the device or application service with one or more underlying supporting networks 120, 125, 130, 135 of the management domain 136. In certain embodiments, the associating and subscribing of the device and/or application service may be performed for the management domain 136 by an orchestrator or by the management domain authority, such as by utilizing the management domain authority engine 137.

In certain embodiments, the management domain authority may drives access to content on behalf of the management domain authority through its devices and services to which they are subscribed. Also, in certain embodiments, when a new application service is added to a device or a supporting network 120, 125, 130, 135, the system 100 and methods may include automatically configuring the new application service for other devices, networks, and/or services under the management domain authority without the need for manual intervention. In certain embodiments, the system 100 and methods may allow any device, application service, and/or network to access (e.g. download) content, while ensuring that the consumption (e.g. display) of the content is constrained to the authorized time, place, format, device, etc., or a combination thereof. In certain embodiments, as a user of the application service and/or device changes his or her location, a predictive scheduler of the management domain authority may anticipate content requirements for its devices and users, and may download all or part of desired content to the most capable devices in the management domain 136. In further embodiments, in anticipation of a management domain authority-driven supporting network change, a device and/or application service may take measures to associate with other supporting networks 120, 125, 130, 135 so as to allow for a smooth transition, such as during a download of desired content.

As shown in FIG. 1, a system 100 for providing cross-services application service, device, and network content delivery management is disclosed. The system 100 may be configured to support, but is not limited to supporting, cloud computing services, content delivery services, satellite services, telephone services, voice-over-internet protocol services (VoIP), software as a service (SaaS) applications, gaming applications and services, productivity applications and services, mobile applications and services, and any other computing applications and services. The system may include a first user 101 that may utilize a first user device 102 to access data, content, and services, or to perform a variety of other tasks and functions. As an example, the first user 101 may utilize first user device 102 to transmit signals to access various online services, such as those provided by a content provider or service provider associated with communications network 135. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. In certain embodiments, the first user device 102 may be a computer, a laptop, a tablet device, a phablet, a server, a mobile device, a smartphone, a smart watch, a motor vehicle, or any other type of computing device. Illustratively, the first user device 102 is shown as a smartphone device in FIG. 1.

In addition to the first user 101, the system 100 may also include a second user 110 that may utilize a second user device 111 to also access data, content, and services, and to perform a variety of other functions. For example, the second user device 111 may be utilized by the second user 110 to transmit signals to request various types of content, services, and data provided by providers associated with communications network 135 or any other network in the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. Similar to the first user device 102, in certain embodiments, the second user device 111 may be a computer, a laptop, a tablet device, a phablet, a server, a mobile device, a smartphone, a smart watch, a motor vehicle, or any other type of computing device. Illustratively, the second user device 111 is shown as a tablet device in FIG. 1.

In certain embodiments, first user device 102 and the second user device 111 may have any number of software applications and/or application services stored and/or accessible thereon. For example, the first and second user devices 102, 111 may include cloud-based applications, mapping applications, location tracking applications, database applications, gaming applications, internet-based applications, browser applications, mobile applications, service-based applications, productivity applications, video applications, music applications, streaming media applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with the any device in the system 100, any network in the system 100, or any combination thereof. In certain embodiments, the first user device 102 and the second user device 111 may include associated telephone numbers, international mobile subscriber identities, or any other identifiers to uniquely identify the first and second user devices 102, 111.

The system 100 may include a communications network 120, which may be utilized by the first and second user devices 102, 111 to communicatively link with each other, such as via a telephone call or other communications session. Additionally, the communications network 120 may be utilized to connect the first and second user devices 102, 111 with any other devices, applications, and/or communications networks 125, 130, 135 inside or outside the system 100. Furthermore, the communications network 120 may be configured to transmit, generate, and receive any information and data traversing the system 100. The communications network 120 may include and be connected to a cloud-computing network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. Illustratively, the communications network 120 is shown as a cellular network including one or more cell towers 122, which may include any number of antennae to facilitate communications for the devices, applications, and networks in the system 100. The cell towers 122 may be utilized to create a cell for the communications network 120. Each cell tower 122 may include an identifier that is utilized to identify the cell tower 122 to any of the networks, devices, and programs in the system 100. The identifier may be a sequence of numbers, characters, or any combination thereof that uniquely identify the cell tower 122. In certain embodiments, the cell tower 122 may be a base station or other similar station, and may include any of the functionality and features of any type of cell site or tower. In certain embodiments, the communications network 120 may be part of a single autonomous system that is located in a particular geographic region, or be part of multiple autonomous systems that span several geographic regions. In certain embodiments, the communications network 120 may be a supporting network of a management domain 136 that may be associated with a management domain authority.

Additionally, the system 100 may include a communications network 125, which may also be utilized by the devices, applications, and/or communications networks 120, 130, 135 to communicate with each other and to other devices, applications, and/or networks inside or outside system 100. The communications network 125 may be configured to transmit, generate, and receive any information and data traversing the system 100. The communications network 125 may include and be connected to a cloud-computing network, a wireless network, an Ethernet network, a satellite network, a broadband network, a cellular network, a private network, a cable network, the Internet, an internet protocol network, a MPLS network, a content distribution network, any network, or any combination thereof. Illustratively, the communications network 125 is shown as Wi-Fi network, which may include any number of wireless access points 127 to facilitate communications for the devices, applications, and networks in the system 100. In certain embodiments, the communications network 125 may be part of a single autonomous system that is located in a particular geographic region, or be part of multiple autonomous systems that span several geographic regions. In certain embodiments, the communications network 125 may be a supporting network of a management domain 136 that may be associated with a management domain authority.

The system 100 may also include a communications network 130, which may be configured to link each of the devices in the system 100 to one another, and be configured to transmit, generate, and receive any information and data traversing the system 100. In certain embodiments, the communications network 130 may include any number of servers, databases, or other componentry, and may be utilized by the devices, applications, and/or communications networks 120, 125, 135 to communicate with each other and with other devices, applications, and/or networks inside and/or outside the system 100. The communications network 130 may also include and be connected to a cloud-computing network, a wireless network, an Ethernet network, a satellite network, a broadband network, a cellular network, a private network, a cable network, the Internet, an internet protocol network, a MPLS network, a content distribution network, any network, or any combination thereof. Illustratively, the communications network 130 is shown as media content network, such as an internet protocol television network that may be utilized to deliver various types of content to the first and second user devices 102, 111. The communications network 130 may include any number of devices 132, which may include, but are not limited to, routers, set-top-boxes, gateways, computing devices, or any combination thereof. The devices 132 may be utilized to facilitate communications between and among the devices, applications, and networks in the system 100. In certain embodiments, the communications network 130 may be part of a single autonomous system that is located in a particular geographic region, or be part of multiple autonomous systems that span several geographic regions. In certain embodiments, the communications network 130 may be a supporting network of a management domain 136 that may be associated with a management domain authority.

The system 100 may further include a communications network 135. Much like communications networks 120, 125, and 130, the communications network 135 of the system 100 may be configured to link each of the devices in the system 100 to one another, and be configured to transmit, generate, and receive any information and data traversing the system 100. In certain embodiments, the communications network 135 may include any number of servers, databases, or other componentry. The communications network 135 may also include and be connected to a cloud-computing network, a wireless network, an Ethernet network, a satellite network, a broadband network, a cellular network, a private network, a cable network, the Internet, an internet protocol network, a MPLS network, a content distribution network, any network or any combination thereof. Illustratively, servers 140 and 145 are shown as being included within communications network 135, and the communications network 135 is shown as a content delivery network. Additionally, the communications network 135 may also include a management domain authority engine 137, which may utilize the servers 140 and 145 to perform its operations. In certain embodiments, the communications network 135 may be part of a single autonomous system that is located in a particular geographic region, or be part of multiple autonomous systems that span several geographic regions. In certain embodiments, the communications network 135 may be a supporting network of a management domain 136 that may be associated with a management domain authority.

Along with the communications networks 120, 125, 130, 135, the system 100 may include a management domain authority associated with a management domain 136. In certain embodiments, the management domain authority may be a customer, user, organization, content provider, a consortium of customers, users, or entities, or any combination thereof, that may be serviced by a service provider or communications provider. The management domain authority may control and preside over a management domain 136, which may include a set of devices, application services, and/or supporting networks 120, 125, 130, 135 that are owned and/or controlled by the management domain authority and are subject to the policies of the management domain authority. For example, illustratively, the management domain 136 includes communications networks 120, 125, 130, 135, servers 140, 145, 160, management domain authority engine 137, and database 155. Notably, however, the management domain 136 may include any number of devices, application services, and/or supporting networks, and may be homogenous or heterogeneous.

The management domain authority may be utilized to centralize the administration of devices, application services, and/or supporting networks 120, 125, 130, 135 with each other and across the networks through which they operate. Each management domain 136 of a management domain authority may have the following characteristics: each application service may potentially be found on one or more devices in the management domain 136, each device may support multiple application services, each device may support multiple supporting networks 120, 125, 130, 135, each supporting network 120, 125, 130, 135 may support multiple devices, and each device may receive content for relay to another device associated with the management domain 136. In certain embodiments, the functionality, the policies, and the features of the management domain authority may be provided by a service provider or other entity in a variety of ways. For example, the functionality, the policies, and the features of the management domain authority may be provided via opt-in software, via a voluntary or mandatory download to the management domain 136, or through any other desired means.

Devices, application services, and/or supporting networks 120, 125, 130, 135 may be added or removed from the management domain 136, such as by utilizing the management domain authority engine 137 of the management domain authority. The management domain authority engine 137 may be any type of computing device, any type of program, any collection of computing devices, any collection of programs, or any combination thereof. In FIG. 1, management domain authority engine 137 includes servers 140, 145 and resides within communications network 135, however, the management domain authority engine 137 may include any number of devices and/or programs or be associated with any other network. A device, application service, or supporting network may be associated with the management domain 136 under control of a management domain authority. In certain embodiments, the associating may involve registering the device, application service, or supporting networks 120, 125, 130, 135 with the management domain 136, the management domain authority, or a combination thereof.

The device, application service, and/or supporting networks 120, 125, 130, 135 may be associated and/or registered with the management domain 136 in a variety of ways. For example, a device telephone number, international mobile subscriber identity, other identifier, or a combination thereof, may be utilized to identify the device with the management domain 136. If the device does not have an international mobile subscriber identity, for example, then a device name may be utilized to identify the device across the supporting networks 120, 125, 130, 135 within the scope of the management domain authority and to the management domain authority engine 137. Application services and supporting networks 120, 125, 130, 135 may be associated with the management domain 136 based on application service identifiers and network identifiers, or other identifiers, respectively. In certain embodiments, devices, application services, and/or supporting networks 120, 125, 130, 135 of a management domain 136 may be associated across layers by physical address/location, by email identifiers, group identifiers, etc. In certain embodiments, devices, application services, and/or supporting networks 120, 125, 130, 135 of a management domain 136 may be multi-valued, have multiple instances, have accounts, utilize authentication, utilize security policies, utilize geolocation policies, or a combination thereof.

In certain embodiments, the associating may be performed by the management domain authority engine 137, a local orchestrator device or program, a cloud-based system, or any combination thereof. In certain embodiments, the associating may be performed in response to receiving a request to join the management domain 136 from a device, application service, or supporting network 120, 125, 130, 135; based on the device being in a list of authorized devices associated with the management domain authority; based on the application service being in a list of authorized application services; based on the supporting network being in a list of authorized supporting networks; based on the management domain authority auto-detecting the device, application service, and/or supporting network 120, 125, 130, 135; based on a recommendation provided by a device, an organization, a member of the community, a member of the management domain 136; or based on any combination thereof. In certain embodiments, if a device, application service, and/or supporting network are recommended to be associated with the management domain 136 from a member, the member may be provided with certain type of incentives, such as, but not limited to, a financial incentives, priority content delivery services, increased bandwidth limits, or any combination thereof.

The policies of the management domain authority may be enforced and propagated by the management domain authority engine 137. Policies may include, but are not limited to, cost cap policies, minimum/maximum/average bandwidth policies, bandwidth consumption policies, packet latency policies, jitter and packet loss requirement policies, security requirement policies, time of day/day of week requirements, location policies, digital rights management parameters, account status policies, other policies, or any combination thereof. The management domain authority engine 137 may propagate policies to any device, application service and/or supporting network 120, 125, 130, 135 under the control of the management domain authority. When policies change or are modified, the management domain authority engine 137 may similarly propagate the changed or modified policies to any device, application service and/or supporting network 120, 125, 130, 135 under the control of the management domain authority. In certain embodiments, certain portions of the management domain 136 may be subject to a certain set of policies, while other portions of the management domain 136 may be subject to a different set of policies.

Once the device, applications service, and/or supporting network 120, 125, 130, 135 are associated with the management domain 136 in accordance with one or more policies, the management domain authority engine 137 may subscribe the device, application services, and/or supporting network 120, 125, 130, 135 with one or more other supporting networks 120, 125, 130, 135 and with each other. In certain embodiments, once the device, application services, and/or supporting network 120, 125, 130, 135 are subscribed, the system 100 may include allowing the policies to be applied to the device, application services, and/or supporting network 120, 125, 130, 135 to access the management domain authority's application service database engine so as to enable one or more new applications to automatically install across one or more networks associated with the management domain authority. In certain embodiments, devices, application services, and/or supporting networks 120, 125, 130, 135 belonging to the management domain 136 may leverage the devices, application services, and/or supporting network 120, 125, 130, 135 of the management domain 136 to ensure that content delivery is efficiently accomplished.

The management domain 136 may receive requests for content, such as from first and second user devices 102,111. In response to such requests, the system 100 may utilize the management domain authority to provide the requestor with access to the content in accordance with the one or more policies of the management domain authority. The content may be provided through a variety of means, such as by utilizing the supporting networks 120, 125, 130, 135 to which the first and second user devices 102, 111 are subscribed. The system 100, such as by utilizing the management domain authority engine 137, may determine if the first and second user devices 102, 111 are authorized to consume the content that has been accessed by the first and second user devices 102, 111. If the first and second user devices 102, 111 are not authorized to consume the content, the system 100 may cause the content to be offloaded onto another device in the system 100 that is authorized for consumption of the content.

In certain embodiments, if there are any conflicts in the management domain 136 of the management domain authority, the management domain authority may institute one or more precedence rules. For example, if a first component or element of the management domain 136 has a conflict with a second component or element of the management domain 136, one of the components may be shut out from a cooperative content delivery endeavor for content segments that are not permitted by components of the management domain 136 that are providing the content delivery service. For example, one component may be shut out from a content delivery operation based on the component's proximity to the device requesting the content or based on other reasons.

Notably, the functionality of the system 100 may be supported and executed by using any combination of the servers 140, 145, and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 120, the communications network 125, the communications network 130, the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the management domain 136, the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the management domain authority engine 137, the servers 140, 145, 160, the first user device 102, the second user device 111, the communications networks 120, 125, 130, or any combination thereof.

The database 155 may also store information and metadata obtained from the system 100, store metadata and other information associated with the first and second users 101, 110, store user profiles associated with the first and second users 101, 110, store device profiles associated with any device in the system 100, store communications traversing the system 100, store user preferences, store information associated with any device or signal in the system 100, store information relating to patterns of usage relating to the first and second user devices 102, 111, store any information obtained from the communications networks 120, 125, 130, or any combination thereof, store any information generated by or associated with the management domain authority engine 137, store performance data for the devices, networks and application services under the control of the management domain authority and within the management domain 136, store the policies of the management domain authority, store diagnostic information for devices, applications, and networks in the management domain 136, store any of the information disclosed for any of the operations and functions disclosed herewith, store any information traversing the system 100, or any combination thereof. Furthermore, the database 155 may be configured to process queries sent to it by any device in the system 100.

Operatively, the system 100 may provide cross-services application service, device, and network content delivery management as shown in the following exemplary scenarios. In a first scenario, the first user 101 may be utilizing first user device 102, which may be a smartphone or other similar device. The first user 101 may also have a motor vehicle, a tablet device, and other computing devices. The first user 101 may activate the first user device 102 and the first user device 102 may be associated and/or registered with a network, such as communications network 120. Once the first user device 102 is associated and/or registered with the communications network 120, the first user device 102 and the communications network 120 may be made available to all devices, application services, and/or supporting networks 125, 130, 135 of the management domain authority and vice versa. Any content requested by the first user 101 via the first user device 102 may be serviced by any of the devices, application services, and/or supporting networks 120, 125, 130, 135 belonging to the management domain 136. The content may be provided to the first user device 102 by certain devices, application services, and/or supporting networks 120, 125, 130, 135 based on the proximity to the first user device 102, bandwidth congestion levels, packet loss levels, policies of the management domain authority, costs, packet latency levels, security policies, time of day/day of week requirements, digital rights management parameters, account status policies, other policies, or any combination thereof.

In a second example scenario, a predictive scheduler associated with the system 100 and management domain authority may be utilized to assist in the delivery of content. The predictive scheduler may be part of the management domain authority engine 137 or part of any application service, device, and/or supporting network 120, 125, 130, 135 of management domain 136. Using this example, the second user 110 may have a television series scheduled for recording on a device of the second user 110, such as a digital video recorder. In the morning, the second user 110 may have scheduled the television series to be recorded during the evening, which may be a peak usage time in the system 100. During the day, when the second user 110 is out and about, the second user device 111, which may be a smartphone, may have access to high speed Wi-Fi, such as provided by communications network 125. The predictive scheduler of the system 100 may, by utilizing the management domain authority, upload the television series to the second user device 111 during the day to assist with curbing congestion in the evening and to ensure that the second user 110 may experience the content without issues. Once the second user 110 returns home, the management domain authority may offload the content from the second user device 111 to the second user's 110 digital video recorder. The management domain authority may control consumption of the content via the digital video recorder based on one or more policies. For example, the management domain authority may only allow the digital video recorder to allow the second user 110 to view the television series at an authorized time in the evening.

In a third example scenario, an example of content offload authorization performed by the system 100 is provided. In this example, the first user 101 may want to view a particular movie via streaming, however, the first user 101 may not have high-speed internet available at the first user's 101 home. The first user 101 may transmit a request for movie while at home, which may be received by a device, application service, and/or supporting network 120, 125, 130, 135 of the management domain authority. The first user 101 may then drive their car to his or her local supermarket, which may include a Wi-Fi network, such as communications network 125. Since the car is in range of the Wi-Fi network, the management domain authority may be configured to transmit instructions to cause the movie file to be downloaded to a storage device of the first user's 101 car while the car is in range of the Wi-Fi network. Once the first user 101 drives home, the management domain authority may cause the movie file to be transferred from the first user's 101 vehicle to the first user's 101 authorized tablet device, which may be first user device 102. The movie file may be transferred from the first user's 101 vehicle by utilizing the first user's 101 home network, which may be communications network 130. Then, the management domain authority may authorize the first user 101 to watch the movie based on one or more policies of the management domain authority.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, associating devices, application services, and devices with a management domain under control of a management domain authority; propagating policies of the management domain to devices, application services, and devices in the management domain; subscribing devices, application services, and networks with supporting networks of the management domain; receiving requests for content; providing access to content in accordance with the policies of the management domain; determining if devices are authorized to consume content; offloading content to devices under control of the management domain authority; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 111, a communications network 120, a communications network 125, a communications network 130, a communications network 135, a management domain authority engine 137, a server 140, a server 145, a server 160, and a database 155. However, the system 100 may include multiple first user devices 102, multiple second user devices 111, multiple communications networks 120, multiple communications networks 125, multiple communications networks 130, multiple communications networks 135, multiple management domain authority engines 137, multiple servers 140, multiple servers 145, multiple servers 160, multiple databases 155, or any number of any of the other components in the system 100. Furthermore, in certain embodiments, substantial portions of the functionality and operations of the system 100 may be performed by other networks and systems that may be connected to system 100.

Figure 2:
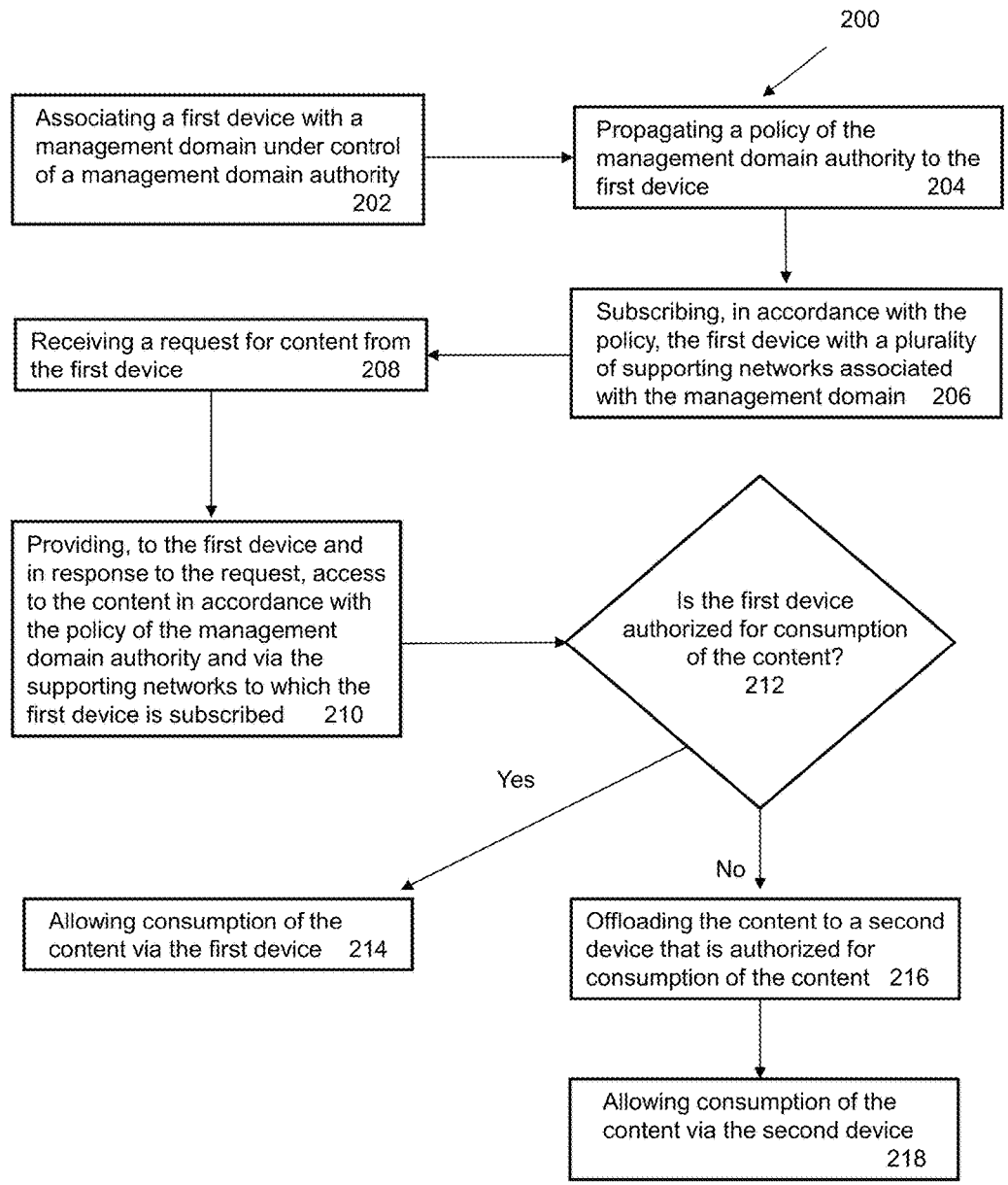
FIG. 2 is a flow diagram illustrating a sample method for providing cross-services application service, device, and network content delivery management according to an embodiment of the present disclosure.

As shown in FIG. 2, an exemplary method 200 for providing cross-services application service, device, and network content delivery management is schematically illustrated, and may include, at step 202, associating a first device, such as first user device 102, with a management domain 136 under control of a management domain authority. In certain embodiments, the associating may include registering the first device with the management domain 136, the management domain authority, or a combination thereof. The method 200 is not limited to associating a device with the management domain 136, but may also associate an application service, a network, a program, or any combination thereof, with the management domain 136. In certain embodiments, the associating may be performed by utilizing the first user device 102, the second user device 111, the management domain authority engine 137, the server 140, the server 145, the server 160, the communications networks 120, 125, 130, 135, any combination thereof, or by utilizing any other appropriate program, system, or device. In certain embodiments, the associating may be performed in response to receiving a request to join the management domain 136 from the first device, based on the first device being in a list of authorized devices associated with the management domain authority, based on the management domain authority auto-detecting the first device, based on a recommendation provided by a device, an organization, a member of the community, or based on any combination thereof.

At step 204, the method 200 may include propagating one or more policies of the management domain authority to the first device. In certain embodiments, the policies may include, but are not limited to, cost caps policies, minimum/maximum/average bandwidth policies, bandwidth consumption policies, packet latency policies, jitter and packet loss requirement policies, security requirement policies, time of day/day of week requirements, location policies, digital rights management parameters, account status policies, other policies, or any combination thereof. In certain embodiments, the propagation of the one or more policies may be performed by utilizing the management domain authority engine 137, management domain 136, the server 140, the server 145, the server 160, the communications networks 120, 125, 130, 135, any combination thereof, or by utilizing any other appropriate program, system, or device. At step 206, the method 200 may include subscribing the first device with one or more supporting networks of the management domain 136 of the management domain authority. For example, the first user device 102 may be subscribed with communications network 120, communications network 125, communications network 130, communications network 135, or any combination thereof. In certain embodiments, the subscribing may be performed by utilizing the first user device 102, the second user device 111, the management domain authority engine 137, the server 140, the server 145, the server 160, the communications networks 120, 125, 130, 135, any combination thereof, or by utilizing any other appropriate program, system, or device.

At step 208, the method 200 may include receiving a request for content from the first device. In certain embodiments, the request for content may be received from the first user device 102, the second user device 111, any combination thereof, or by utilizing any other appropriate program, system, or device. In certain embodiments, the request may be a request for a service, a request for information, any type of request, or any combination thereof. At step 210, the method 200 may include providing, in response to the request, the first device with access to the content in accordance with the one or more policies of the management domain authority and via one or more of the supporting networks of the management domain 136. In certain embodiments, the access to the content may be provided by the communications networks 120, 125, 130, 135, the management domain authority engine 137, the management domain 136, the server 140, the server 145, the server 160, any combination thereof, or by utilizing any other appropriate program, system, or device. In certain embodiments, providing access to the content may include allowing the first device or another device within the management domain 136 to download the content. In certain embodiments, having access to the content may not mean that the content may be consumed if the device that accesses the content is not authorized for consumption of the content.

The method 200 may include, at step 212, determining if the first device is authorized for consumption of the content. In certain embodiments, if the first device is authorized for consumption, it may mean that the first device may display or otherwise output the content to a user, such as the first user 101. In certain embodiments, the determining may be performed by utilizing the first user device 102, the second user device 111, the management domain authority engine 137, the server 140, the server 145, the server 160, the communications networks 120, 125, 130, 135, any combination thereof, or by utilizing any other appropriate program, system, or device. If the first device is authorized for consumption of the content, the method 200 may include, at step 214, allowing the first device to consume the content. For example, if the first user 101 is using first user device 102 and the first user device 102 is authorized for consumption of content, the first user device 102 may display the content to the first user 101. In certain embodiments, the allowing may be performed by utilizing the first user device 102, the second user device 111, the management domain authority engine 137, the server 140, the server 145, the server 160, the communications networks 120, 125, 130, 135, any combination thereof, or by utilizing any other appropriate program, system, or device.

If, however, the first device is determined to not be authorized for consumption of the content, the method 200 may include, at step 216, offloading the content to a second device that is authorized for consumption of the content. For example, the content accessed by the first device may be offloaded to a second device that is authorized for consumption of the content. In certain embodiments, the offloading may be performed by utilizing the first user device 102, the second user device 111, the management domain authority engine 137, the server 140, the server 145, the server 160, the communications networks 120, 125, 130, 135, any combination thereof, or by utilizing any other appropriate program, system, or device. At step 218, the method 200 may include allowing the second device to consume the content. For example, the second device may display or otherwise output the content so that a user may view the content. Notably, the method 200 may incorporate any of the features and functionality described for the system 100 or as otherwise described herein.

The systems and methods disclosed herein may include additional functionality and features. For example, the system 100 and methods may be configured to allow a device, application service, and/or network that is associated with the management domain 136/management domain authority to be made available for use by all other devices, application services, and/or networks under the control of the management domain authority. In certain embodiments, the associated device, application service, and/or network may be made available for use by only a subset of the other devices, applications services, and/or networks under the control of the management domain authority. In certain embodiments, when a new application service is added by a user to a device and/or supporting networks 120, 125, 130, 135, the new application service may be optionally configured by the management domain authority's propagation policies for other devices, application services, and/or supporting networks 120, 125, 130, 135 without the need for manual intervention.

The systems and methods may also include enabling devices, supporting networks, and/or application services to obtain content, while preserving the rights of copyright owners associated with the content. For example, a device of the management domain 136 may be authorized to obtain or download the content, but may be prevented from displaying or otherwise outputting the content if the device is not authorized to do so. In certain embodiments, any device in the management domain 136 may be allowed to access (e.g. download) content, while ensuring that consumption of the content is constrained to the time, place, format, device, etc. for which a copyright license or other license extends to users. In certain embodiments, the systems and methods may allow for the setup of a completely permissive management domain authority policy. A completely permissive management domain authority policy may allow for the acceptance of a new device, application service, and/or supporting network, and have the new device, application service, and/or supporting network be available to all elements (e.g. devices, application services, networks) under the control of the management domain authority. For example, under such a policy, a device that is newly added to the management domain 136 may be made available for use to all other devices under the control of the management domain authority under all circumstances.

In other embodiments, a more restrictive management domain authority policy may be utilized. Under a more restrictive management domain authority policy, the management domain authority may institute constraints on certain supporting networks based on costs or certain application service content due to digital rights management requirements. The management domain authority may institute any type of constraints, such as, but not limited to, location constraints, packet loss constraints, bandwidth constraints, or any combination thereof. As an example, if a user purchases a new device, the new device may be identified over a supporting network 120, 125, 130, 135 and to the management domain authority. The management domain authority engine 137 may then propagate the restrictive policies of the management domain authority to the new device, including applications and supporting networks 120, 125, 130, 135. As a result, the new device may first become associated with the supporting networks 120, 125, 130, 135. Then, the new device may apply the management domain authority's policies to access an application service database engine of the management domain authority so as to automatically cause one or more applications to be installed across an original network and/or any new supporting networks 120, 125, 130, 135.

The systems and methods may include utilizing machine-learning functions of the management domain authority to drive adaptive and predictive elements, such as when a user of a device and/or application moves in physical space, such as from one location to another. In such a scenario, a scheduler program of the management domain authority may be configured to anticipate content requirements for the various devices and users under the management domain authority, and may access (e.g. download) all or part of selected content to devices that are determined to be the most able to handle the accessing and/or storage of the content. If necessary, the content may then be relayed from the devices that accessed and/or stored the content to an authorized consumption (e.g. viewing) device for consumption. Such machine-learning functions may utilize linear trace vectors of the physical tracks of the devices of users, the predicted and measured network utilization and congestion, and/or even the digital calendars of the users (e.g. digital calendars on a mobile device) when making decisions.

In certain embodiments, the systems and methods may include enabling devices and their users within a particular management domain 136 to share content with other devices and users in the management domain 136 when their devices physically converge either in a direct peer-to-peer connection or through a common, local network that may efficiently cross-load content payloads. For example, a user may have a user account that allows tablet users to view or otherwise consume content. The user may have a car that may be connected to free Wi-Fi at the user's home or in a public setting. If the user and the tablet device are away from the car, desired content may be downloaded to the user's connected car, which may not be authorized for consumption (e.g. viewing) of the content. Since the car and the tablet device of the user share a common management domain authority, the car may be authorized to obtain the content on the user's behalf for later display on the user's tablet device, which is authorized to display the content. For example, when the user returns to the car with the user's tablet device, the content downloaded by the car may be offloaded to the user's tablet device so that the user can view the content on the tablet device.

The management domain authority's predictive and adaptive learning algorithms may facilitate such actions and notify the user of a content download's pending completion based on the user's calendar and the availability of network resources utilized in support of the caching to be performed by the user's connected car. The adaptive and predictive learning of both the supporting networks 120, 125, 130, 135 and the devices within the management domain 136 may allow for smooth media content experiences as they converge and diverge from network resources and each other. In certain embodiments, the supporting networks 120, 125, 130, 135 may change, and, in certain cases, the application services may change as well as the management domain authority's engine 137 reassesses compliance with the management domain authority's policies. This may ensure that the policies of the management domain authority are followed without needing a user to manually intervene, and "reconnect," for example. In certain embodiments, in anticipation of a management domain authority-driven supporting network change, a device and/or application may take measures to associated with other supporting networks so as to result in a smooth transition, such as during content delivery.

The systems and methods may enable a device to associate or register with a management domain in a variety of ways. For example, a device telephone number, international mobile subscriber identity, other identifier, or a combination thereof, may be utilized to identify the device with the management domain. In certain embodiments, if the device does not have an international mobile subscriber identity, for example, then a device name may be utilized to identify the device across the supporting networks 120, 125, 130, 135 within the scope of the management domain authority. In such a scenario, each management domain authority owner may ensure that each device in the management domain 136 has a unique name. For example, a user device may be named "Gordon's G5A," which may have a corresponding Dynamic Host Configuration Protocol (DHCP) entry on a router table for an internet protocol television network. The same device name "Gordon's G5A" may be in a router table for a mobile network/connected vehicle of a user, and the same device name "Gordon's G5A" may be on a cellular account of the user that has a particular international mobile subscriber identity.

Using the above example, the user device may have three connectivity supporting network options: the internet protocol television network, the mobile network associated with the connected vehicle, and the cellular network. A management domain authority owner may establish when the user device will use each of the supporting networks. In an example scenario, the user's internet protocol television network bandwidth usage may be limited by the Very-High-Bit-Rate Digital Subscriber Line (VDSL) profile for the user of the user device. The user's plan associated with the mobile network for the connected vehicle may be limited to 3 GB/month, and user's plan associated with the cellular network may be limited to 60 GB/month. If the user is near the user's home, the policy of the management domain authority may cause the user device to associate with the internet protocol television network router. If, however, the user is driving on the road, the policy of the management domain authority may cause the user device to associate with and use the mobile network that is associated with the connected vehicle, the cellular network, or a combination thereof. If, the user device is being utilized to watch a movie, streaming content, or other content associated with high bandwidth usage, the user device and its accompanying application service may be required to use the cellular network and not the mobile network because of cost issues and download restrictions that may be specified in the policies. In certain embodiments, the management domain authority engine 137 may limit the data volume utilized for certain types of content, such as, but not limited to, streaming content, movie content, or a combination thereof.

The systems and methods may include still further functionality and features. For example, a customer of a service provider may own a variety of devices and application services. The customer, which may be a business organization or even a user, may have all the devices and application services configured to be within the scope and control of a common management domain authority. Based on the foregoing, the service provider may target the customer for service upgrades, bundling packages, and other promotional initiatives from various suppliers. By making the management domain authority flexible enough to include third party vendor device and application service configuration data, as well as devices and application service configurations of devices and applications created or installed by the management domain authority owner (e.g. customer), then the behavior of the devices and application services may be managed through a cloud computing network, such as communications network 135, and/or through a local server.

In certain embodiments, an adapter, such as a software program, may be created to read the Management Information Base (MIB) associated with the management domain authority. This may enable Simple Network Management Protocol (SNMP) or other interfaces to manage the elements in the management domain. If there is only a manual interface, such as (teletype) TTY or graphical user interface (GUI), then the adapter may need to interact at such a level and provide system-level primitives to manage the device and/or application services under the scope of the management domain authority.

In certain embodiments, the systems and methods may include providing the management domain authority with diagnostic capabilities, which may be utilized to assess the performance of each device, application service, and supporting network 120, 125, 130, 135 under the management domain 136. Additionally, the diagnostic capabilities may be utilized to determine the influences of each element in the management domain 136 on the experience of each member belonging to the management domain authority. The management domain authority, such as via the management domain authority engine 137, may spin up or launch diagnostic application services for continuous, periodic, or one-time use, such as when a particular performance threshold is crossed. The resulting data provided from the operations of such diagnostic services may be stored locally, in a cloud-computing environment, or any combination thereof. In certain embodiments, the upload of the resulting data may be more manageable if it is only held in the event there is a performance threshold crossed, a system alarm, or a failure that occurs for an element in the management domain 136 of the management domain authority. The resulting data may be utilized to enrich trouble tickets associated with the management domain 136 and/or may be utilized as input for various correlative algorithms that may be utilized to determine the causes of failures or degradations in performance.

Notably, the systems and methods may reduce and largely eliminate the repetitive and often flawed, manual administration of devices, applications services, and/or their supporting networks 120, 125, 130, 135. Additionally, the systems and methods provide users and organizations with consistency of availability of application services and devices across various locations and supporting networks 120, 125, 130, 135 and with consistency with regard to external policy rules, such as those associated with digital rights management. The systems and methods also allow for superior monitoring and measurement of user experiences and to drive up promoter scores. By having performance-based policies, which may be constrained by cost-behavior policies, the user experiences may be more rewarding for the users and less troublesome for service providers and their customers. Furthermore, by allowing a cloud-based management domain authority to be mirrored, either all or in part, in one or more parts of a customer's application, devices, and/or supporting network environments, it may provide further understanding of the environments through which the customer's applications and devices traverse, alone with their performance. The cloud environment that may be utilized to support the management domain authority may be accessed through application programming interfaces (APIs), which may provide service providers with a family of interface methods for the cloud-based management domain authority.

Figure 3:
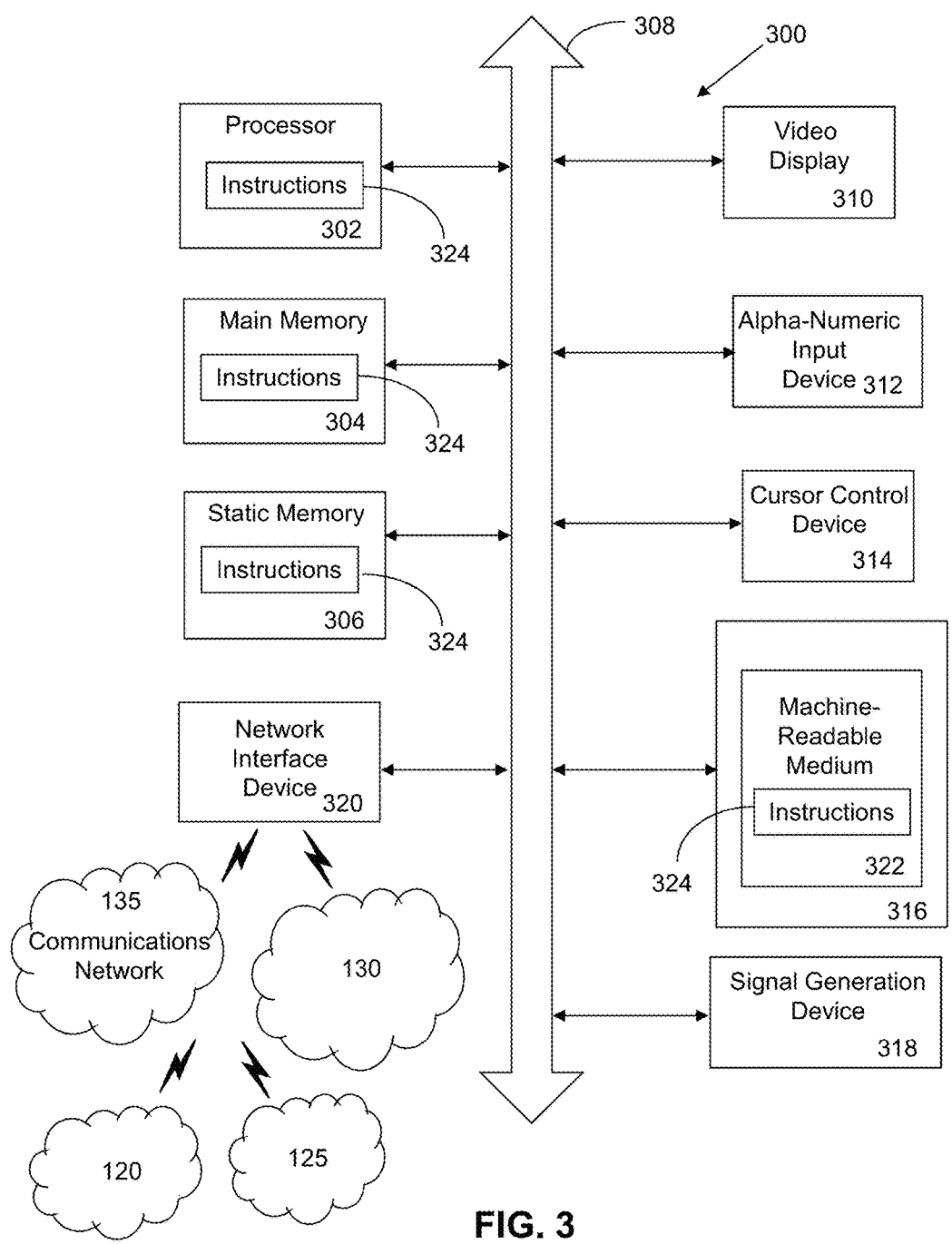
FIG. 3 is a schematic diagram of a machine in the form of a computer system within which a set of instructions, when executed, may cause the machine to perform any one or more of the methodologies or operations of the systems and methods for providing cross-services application service, device, and network content delivery management.

Referring now also to FIG. 3, at least a portion of the methodologies and techniques described with respect to the exemplary embodiments of the system 100 can incorporate a machine, such as, but not limited to, computer system 300, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 120, communications network 125, communications network 130, communications network 135, another network, or a combination thereof) to and assist with operations performed by other machines and systems, such as, but not limited to, the first user device 102, the second user device 111, the management domain authority engine 137, the server 140, the server 145, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310, which may be, but is not limited to, a liquid crystal display (LCD), a flat panel, a solid state display, or a cathode ray tube (CRT). The computer system 300 may include an input device 312, such as, but not limited to, a keyboard, a cursor control device 314, such as, but not limited to, a mouse, a disk drive unit 316, a signal generation device 318, such as, but not limited to, a speaker or remote control, and a network interface device 320.

The disk drive unit 316 may include a machine-readable medium 322 on which is stored one or more sets of instructions 324, such as, but not limited to, software embodying any one or more of the methodologies or functions described herein, including those methods illustrated above. The instructions 324 may also reside, completely or at least partially, within the main memory 304, the static memory 306, or within the processor 302, or a combination thereof, during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 322 containing instructions 324 so that a device connected to the communications network 120, communications network 125, communications network 130, communications network 135, another network, or a combination thereof, can send or receive voice, video or data, and communicate over the communications network 120, communications network 125, communications network 130, communications network 135, another network, or a combination thereof, using the instructions. The instructions 324 may further be transmitted or received over the communications network 120, communications network 125, communications network 130, communications network 135, another network, or a combination thereof, via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions; and
a processor that executes the instructions to perform operations, the operations comprising:
associating a first device with a management domain under control of a management domain authority;
propagating a policy of the management domain authority to the first device;
subscribing, in accordance with the policy, the first device with a plurality of networks associated with the management domain;
receiving, from the first device, a request for content;
blocking a component of the management domain from a content delivery operation associated with providing access to the content, wherein the component is blocked from the content delivery operation based on a proximity of the component to the first device that made the request for the content and based on a conflict of the component with a different component of the management domain; and
providing, to the first device and in response to the request, access to the content in accordance with the policy of the management domain authority and without using the component blocked from the content delivery operation, wherein the access to the content is provided via at least one network of the plurality of networks to which the first device is subscribed.

2. The system of claim 1, wherein the operations further comprise determining, based on the policy, if the first device is authorized for consumption of the content.

3. The system of claim 2, wherein the operations further comprise offloading, if the first device is determined to not be authorized for consumption of the content, the content to a second device that is authorized for consumption of the content, wherein the second device is under control of the management domain authority.

4. The system of claim 1, wherein the operations further comprise enabling the first device to apply the policy of the management domain authority to automatically install an application on the first device, the plurality of networks, a second device of the management domain, or any combination thereof.

5. The system of claim 1, wherein the operations further comprise providing access to the content based on predicted and measured network utilization and congestion associated with the plurality of networks of the management domain.

6. The system of claim 1, wherein the operations further comprise providing access to the content based on a calendar of a user associated with the first device.

7. The system of claim 1, wherein the operations further comprise adjusting subscription of the first device with the plurality of networks based on a change in the policy of the management domain authority.

8. The system of claim 1, wherein the operations further comprise associating the first device with the management domain under control of the management domain authority in response to receiving a request from the first device to join the management domain.

9. The system of claim 1, wherein the operations further comprise associating the first device with the management domain under control of the management domain authority in response to receiving a recommendation from a member of the management domain.

10. The system of claim 1, wherein the operations further comprise activating a diagnostic application to gather data associated with the first device if the performance of the first device falls below a threshold performance value.

11. The system of claim 1, wherein the operations further comprise propagating the policy of the management domain authority to the first device, wherein the policy is selected from a cost cap policy, a bandwidth policy, a bandwidth consumption policy, a packet latency policy, a jitter policy, a packet loss policy, a security requirement policy, a time-related policy, a location policy, a digital rights management policy, an account status policy, a device policy, or any combination thereof.

12. The system of claim 1, wherein the operations further comprise configuring the first device based on the policy of the management domain authority.

13. A method, comprising:
    associating a first device with a management domain under control of a management domain authority;
    propagating, by utilizing instructions from memory that are executed by a processor, a policy of the management domain authority to the first device;
    subscribing, in accordance with the policy, the first device with a plurality of networks associated with the management domain;
    receiving, from the first device, a request for content;
    blocking a component of the management domain from a content delivery operation associated with providing access to the content, wherein the component is blocked from the content delivery operation based on a proximity of the component to the first device that made the request for the content and based on a conflict of the component with a different component of the management domain; and
    providing, to the first device and in response to the request, access to the content in accordance with the policy of the management domain authority and without using the component blocked from the content delivery operation, wherein the access to the content is provided via at least one network of the plurality of networks to which the first device is subscribed.

14. The method of claim 13, further comprising determining, based on the policy, if the first device is authorized for consumption of the content.

15. The method of claim 14, further comprising enabling the first device to display the content if the first device is authorized for consumption of the content.

16. The method of claim 13, further comprising constraining, after providing access to the content, consumption of the content based on a time of day, a type of device of the first device, a location of the first device, a format of the content, or any combination thereof.

17. The method of claim 13, further comprising enabling the first device to apply the policy of the management domain authority to automatically install an application on the first device, the plurality of networks, a second device of the management domain, or any combination thereof.

18. The method of claim 13, further comprising sharing the content with a second device of the management domain via a peer-to-peer connection when the first device and the second device are in proximity with each other.

19. The method of claim 13, further comprising adjusting an application provided to the first device based on a change in the policy of the management domain authority.

20. The method of claim 13, further comprising providing access to the content based on predicted and measured network utilization and congestion associated with the plurality of networks of the management domain, or based on a combination thereof.

21. A computer-readable device comprising instructions, which when executed by a processor, cause the processor to perform operations comprising:
    associating a first device with a management domain under control of a management domain authority;
    propagating a policy of the management domain authority to the first device;
    subscribing, in accordance with the policy, the first device with a plurality of networks associated with the management domain;
    receiving, from the first device, a request for content;
    blocking a component of the management domain from a content delivery operation associated with providing access to the content, wherein the component is blocked from the content delivery operation based on a proximity of the component to the first device that made the request for the content and based on a conflict of the component with a different component of the management domain; and
    providing, to the first device and in response to the request, access to the content in accordance with the policy of the management domain authority and without using the component blocked from the content delivery operation, wherein the access to the content is provided via at least one network of the plurality of networks to which the first device is subscribed.

* * * * *